United States Patent [19]
DiFonzo

[11] 3,963,990
[45] June 15, 1976

[54] INTERFERENCE REDUCTION CIRCUIT

[75] Inventor: Daniel F. DiFonzo, Rockville, Md.

[73] Assignee: Communications Satellite Corporation (Comsat), Washington, D.C.

[22] Filed: Feb. 27, 1974

[21] Appl. No.: 446,459

[52] U.S. Cl. .................................. 325/476; 325/60; 328/166; 333/21 A
[51] Int. Cl.² ........................................ H04B 15/00
[58] Field of Search ................ 325/3, 4, 47, 56, 60, 325/65, 323, 324, 367, 366, 369, 371, 377, 378, 473, 474–476; 179/15 BC, 15 AN; 328/162, 165, 166; 333/10, 12, 21 A; 343/100 PE, 176, 756, 853

[56] References Cited
UNITED STATES PATENTS

| | | |
|---|---|---|
| 3,668,567 | 6/1972 | Rosen ................................ 333/21 A |
| 3,728,643 | 4/1973 | Chu ................................... 333/21 A |
| 3,735,266 | 5/1973 | Amitay ................................ 325/60 |

*Primary Examiner*—Benedict V. Safourek
*Assistant Examiner*—Marc E. Bookbinder
*Attorney, Agent, or Firm*—Sughrue, Rothwell, Mion, Zinn & Macpeak

[57] ABSTRACT

An interference reduction circuit to provide isolation in frequency reuse systems operates on two or more non-isolated signals by cross-coupling the signals such that the interfering signals are cancelled on each channel. In a dual-polarized frequency reuse system, cancellation is effected by adding a sample of an oppositely polarized channel of equal amplitude, but of opposite phase, to the interference. Practical implementation includes closed-loop, digital feedback control to permit dynamic signal-to-interference improvement involving no a priori knowledge of the nature of the incoming signals. The circuit has applications in satellites and earth stations in a communications satellite system.

13 Claims, 18 Drawing Figures

TWO NON ORTHOGONAL,
ELLIPTICALLY POLARIZED SIGNALS $$k = 20 \log \sqrt{\frac{1}{1 + A_{11}/A_{21}}}$$

$$A_{11} = \sqrt{\cos^2\alpha + r^{-2}\sin^2\alpha}$$

$$A_{21} = \sqrt{\sin^2\alpha + r^{-2}\cos^2\alpha}$$

$L = -20 \log [A_{11} - A_{21}]$
$A_{11} = \sqrt{\cos^2\alpha + r^{-2}\sin^2\alpha}$
$A_{21} = \sqrt{\sin^2\alpha + r^{-2}\cos^2\alpha}$
$r$ = AXIAL RATIO

INTERFERENCE REDUCTION CIRCUIT

BACKGROUND OF THE INVENTION

1. Field of the Invention:

The present invention generally relates to communications systems, and, more particularly, to interference reduction circuits to provide polarization isolation is frequency reuse systems of the type where each "polarization" of a dual-polarized communications link carries independent information at the same RF frequencies.

2. Description of the Prior Art:

Using two orthogonal polarizations simultaneously effectively doubles the bandwidth of a communications system. Even greater effective bandwidth can be achieved by using multiple antenna beams at the satellite which are isolated via spatial separation among the beams. Systems using these techniques are referred to as frequency reuse sytems and are of particular interest in communications satellite systems. However, due to the polarization characteristics of the spacecraft antenna and the earth station antenna such as non-ideal feed axial ratio, antenna depolarization, and the like, there exists a certain amount of "static" cross-coupling of signals. In addition, such factors as Faraday rotation, spacecraft orientation and depolarization of signals due to rainfall effects, there is a rather large coupling of signals which is "dynamic" (i.e., time-varying) in nature. Both the static and dynamic cross-polarization interference act to seriously degrade the performance of frequency reuse systems. Recently, an article appearing in *The Bell System Technical Journal*, vol. 50, No. 9, November, 1971, at pgs. 3063 to 3069 by T. S. Chu entitled "Restoring the Orthogonality of Two Polarizations in Radio Communication Systems, I" suggested an orthogonalizing circuit which applies differential phase shift and differential attenuation to two signals to orthogonalize them. For a receiving system, the circuit described by Chu is implemented in the waveguide between the antenna and the receiver and it operates directly on the fields in a dual-polarized waveguide. It is designed to provide a single correction applied over the entire receive bandwidth and its implementation on a channelized basis (i.e., separate corrections for different portions of the frequency band) would be difficult.

SUMMARY OF THE INVENTION A

It is, therefore, an object of this invention to provide a simple interference reduction circuit featuring improved polarization isolation for use at one end of a frequency reuse communications link which can be implemented following the receiver either on a "broad band" basis or on a channelized basis to provide independent interference correction for several different frequency bands.

The foregoing and other objects of the invention are attained by providing an interference reduction circuit which operates on two or more spatially non-isolated signals by cross-coupling the signals such that the interfering signals are cancelled in each channel. Described in the context of a dual-polarized system, cancellation is effected by adding a sample of an oppositely polarized channel of equal amplitude, but of the opposite phase, to the interference. The realization of the circuit in one illustrative embodiment involves the sampling of a portion of the signal in each port of a dual-polarized system and feeding this signal back to the other port at a point where the signal in that port has experienced a time delay such that the undesired signal is cancelled in that port. The technique is readily extended to multiport systems by introducing coupling from each port to all other ports in such a manner that interfering signals in the other ports are (at least partially) cancelled. All that is required is that there be as many ports as there are desired signals and that there be at least one port at which the desired signal is stronger than the undesired signals.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

In order to place the need for polarization adaptability in proper perspective, it is instructive to review some of the sources of polarization degradation and their effect on isolation. In a satellite-to-earth link which is dual linearly polarized, the primary sources of isolation degradation are:
a. Faraday rotation,
b. spacecraft orientation,
c. polarization characteristics of the spacecraft antenna,
d. polarization characteristics of the earth station antenna, and
e. depolarization due to rain.

Figure 1:
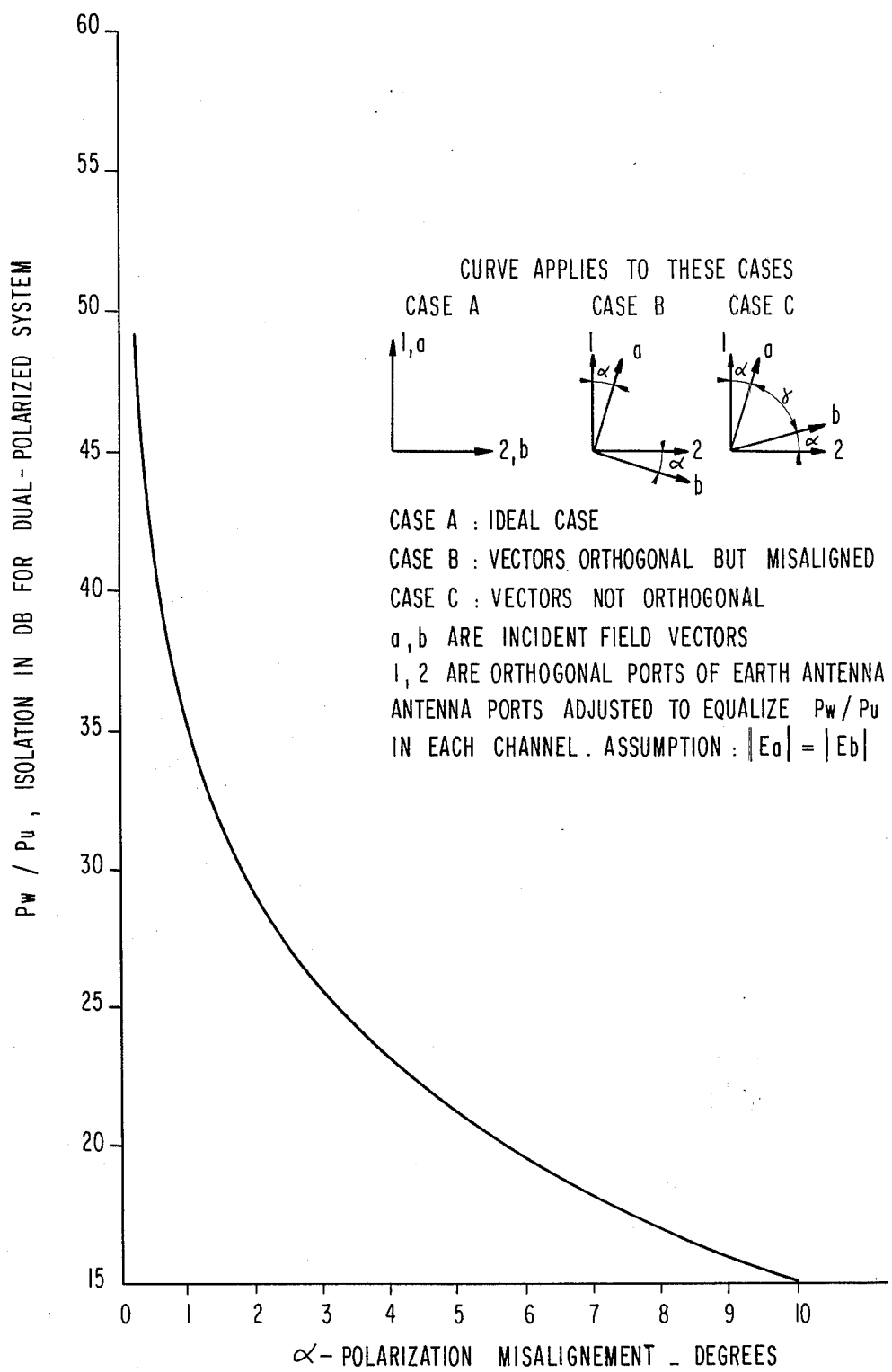
FIG. 1 is a graph showing isolation degradation due to polarization misalignment in a linear dual-polarized system.

In the field vectors incident to an earth station are orthogonal and if the earth station antenna is linearly polarized, then the ratio of wanted to unwanted received powers ($P_w/P_u$) at each port of the earth antenna is infinite. If, however, due to one of the above effects, the incident vectors are either not orthogonal or are misaligned with respect to the earth antenna's field vectors, the isolation is degraded. The magnitude of this effect is shown in FIG. 1 which illustrates $P_w/P_u$ in one channel of the earth antenna vs. the misalignment of the incident field vectors. For example, if the incident vectors depart from orthogonality by 1° (or alternatively, are orthogonal but misaligned with the earth antenna by 1°), the isolation is reduced from infinity to 35.5-dB. A 5° misalignment reduces the isolation to 22-dB. The curve in FIG. 1 is for vector orientations which equalize the $P_w/P_u$ in each channel. If the earth antenna does not track the polarization of the incoming wave, the $P_w/P_u$ for each channel will be different.

Figure 2:
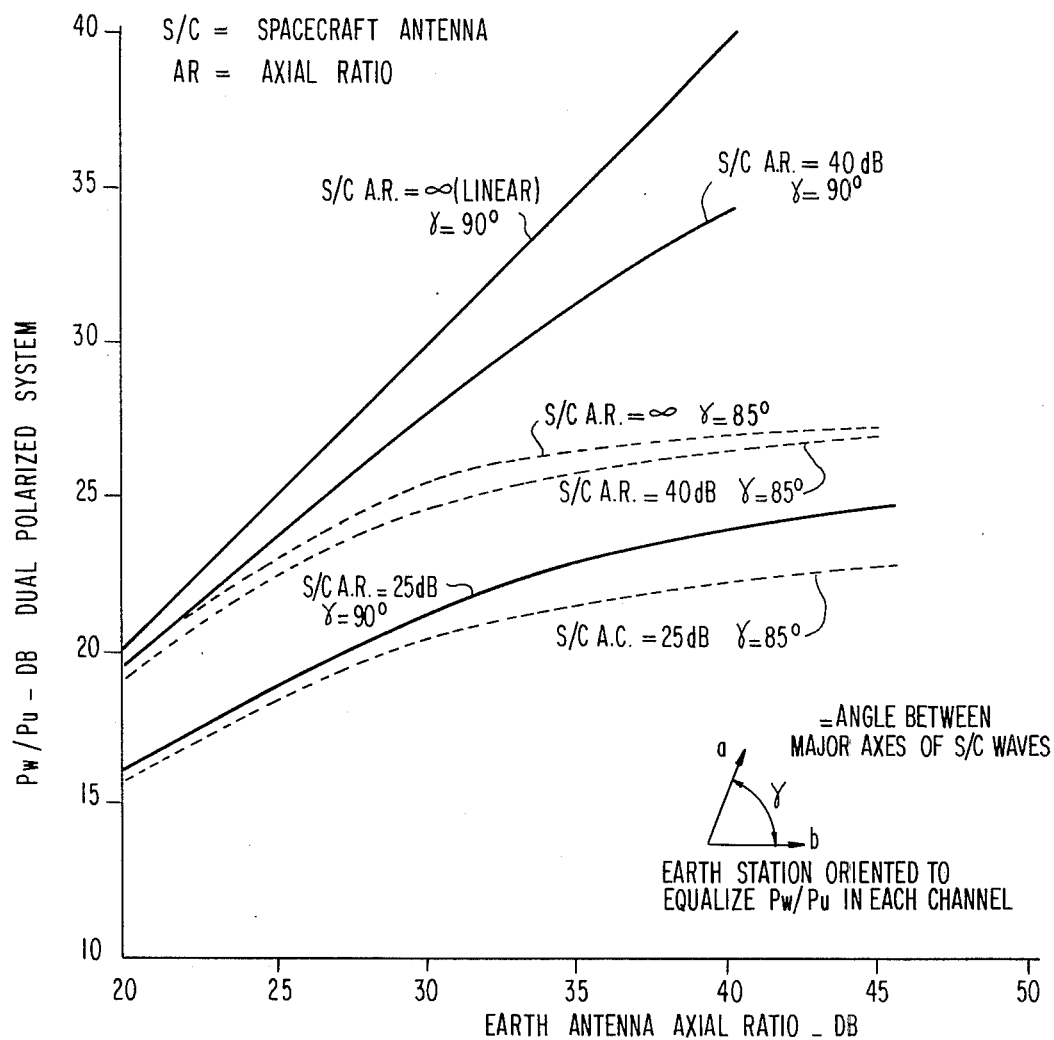
FIG. 2 is a graph of a series of curves showing polarization isolation as a function of earth station axial ratio.

The situation is even more serious in the event that the earth and spacecraft antennas have a finite axial ratio (i.e., are not perfectly linearly polarized). FIG. 2 illustrates the $P_w/P_u$ vs. earth station axial ratio for several cases of axial ratio and departure from orthogonality of the major axes of the incident wave where, again, the earth station orientation is adjusted to equalize $P_w/P_u$ in each channel.

It should be mentioned that the $P_w/P_u$ degradation is even more serious for circularly polarized systems based on present technology hardware capabilities. Also, in a complete system, the combined effects of uplink and downlink isolation will still further reduce the $P_w/P_u$.

The need for an antenna system which could compensate for these effects is clear. Since the polarization misalignment is generally a time-varying quantity, any compensating system should be dynamic (i.e., continuously adjustable).

A concept has been developed that can significantly improve $P_w/P_u$ in a dual-polarized frequency reuse system and which is, in principle, capable of being extended to multiple-beam systems. Basically, the technique involves sampling a portion of the signal in each port of a dual-polarized system and feeding this sampled signal back to the other port at a point where the signal in that port has experienced a time delay such that the undesired signal is cancelled in that port. The idea can be extended to multi-port systems by introducing coupling from each port to all other ports in such a manner that interfering signals in the other ports are (at least partially) cancelled. For clarity of presentation, the circuit description assumes that the incident signals have identical amplitudes, although this is not necessary to the operation of the circuit.

Figure 3:
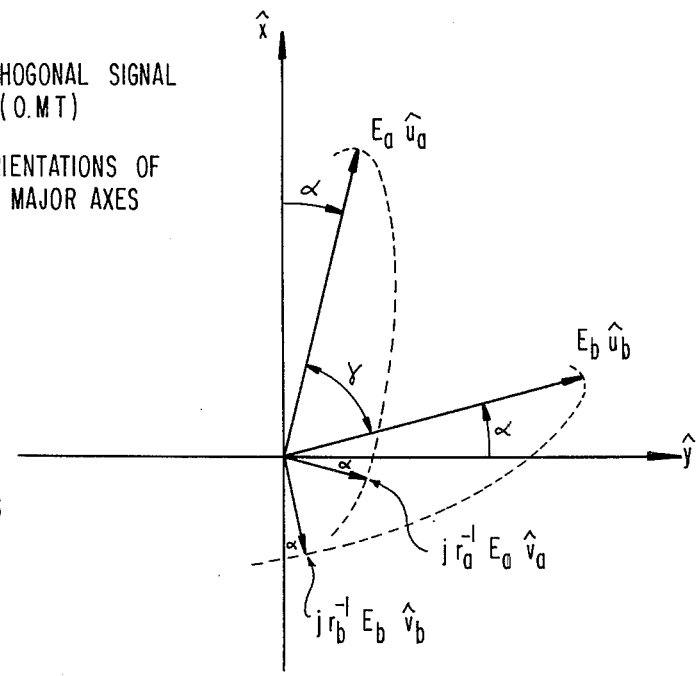
FIG. 3 illustrates a general set of two frequency reuse signals that might be incident on a receiving system.

A general set of two frequency reuse signals which might be incident on a receiving system is shown in FIG. 3. Let $E_a$ and $E_b$ represent the amplitudes of the major axes of the two non-orthogonal elliptically polarized waves having axial ratios $r_a$ and $r_b$, respectively. The sign of $r$ is negative for left hand and positive for right hand rotation (wave receding); furthermore, $1 \leq |r| \leq \infty$. The orthogonal ports of the receiving device are designated $\hat{x}$ and $\hat{y}$, respectively. It is assumed that the port orientation is as shown in FIG. 3 so that the unit vectors shown in the FIGURE have the following rectangular components:

$$\hat{u}_a = \cos\alpha\,\hat{x} + \sin\alpha\,\hat{y} \qquad \hat{u}_b = \sin\alpha\,\hat{x} + \cos\alpha\,\hat{y}$$
$$\hat{v}_a = -\sin\alpha\,\hat{x} + \cos\alpha\,\hat{y} \qquad \hat{v}_b = -\cos\alpha\,\hat{x} + \sin\alpha\,\hat{y}$$

The port voltages, $E_x$ and $E_y$ are then
$$E_x = (E_a \hat{u}_a + j r_a^{-1} E_a \hat{v}_a) \cdot \hat{x} + (E_b \hat{u}_b + j r_b^{-1} E_b \hat{v}_b) \cdot \hat{x} \quad (1)$$

$$E_y = (E_b \hat{u}_b + j r_b^{-1} E_b \hat{v}_b) \cdot \hat{y} + (E_a \hat{u}_a + j r_a^{-1} E_a \hat{v}_a) \cdot \hat{y} \quad (2)$$

Then, $$\begin{bmatrix} E_x \\ E_y \end{bmatrix} = \begin{bmatrix} c_{11} & c_{12} \\ c_{21} & c_{22} \end{bmatrix} \begin{bmatrix} E_a \\ E_b \end{bmatrix} \qquad (3)$$

where $$c_{11} = \cos\alpha - j r_a^{-1} \sin\alpha \qquad (4)$$

$$c_{12} = \sin\alpha - j r_b^{-1} \cos\alpha \qquad (5)$$

$$c_{21} = \sin\alpha + j r_a^{-1} \cos\alpha \qquad (6)$$

$$c_{22} = \cos\alpha + j r_b^{-1} \sin\alpha \qquad (7)$$

It will be convenient to express the $c_{ij}$ in polar form so that $$\begin{bmatrix} E_x \\ E_y \end{bmatrix} = \begin{bmatrix} A_{11} e^{j\beta_{11}} & A_{12} e^{j\beta_{12}} \\ A_{21} e^{j\beta_{21}} & A_{22} e^{j\beta_{22}} \end{bmatrix} \begin{bmatrix} E_a \\ E_b \end{bmatrix} \qquad (8)$$

where $$A_{11} = |c_{11}| = \sqrt{\cos^2\alpha + r_a^{-2} \sin^2\alpha} \qquad (9)$$

$$A_{12} = |c_{12}| = \sqrt{\sin^2\alpha + r_b^{-2} \cos^2\alpha} \qquad (10)$$

$$A_{21} = |c_{21}| = \sqrt{\sin^2\alpha + r_a^{-2} \cos^2\alpha} \qquad (11)$$

$$A_{22} = |c_{22}| = \sqrt{\cos^2\alpha + r_b^{-2} \sin^2\alpha} \qquad (12)$$

$$\beta_{11} = -\tan^{-1}\left[\frac{\tan\alpha}{r_a}\right] \qquad (13)$$

$$\beta_{12} = -\tan^{-1}\left[\frac{\cot\alpha}{r_b}\right] \qquad (14)$$

$$\beta_{21} = \tan^{-1}\left[\frac{\cot\alpha}{r_a}\right] \qquad (15)$$

$$\beta_{22} = \tan^{-1}\left[\frac{\tan\alpha}{r_b}\right] \qquad (16)$$

Figure 4:
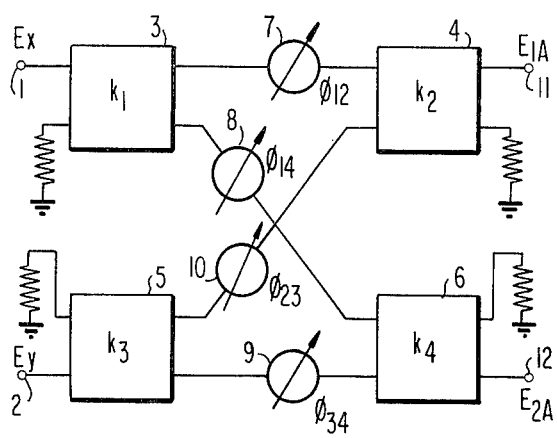
FIG. 4 is a circuit block diagram illustrating an embodiment of the interference reduction circuit according to the principles of the invention.

As shown in FIG. 4, the interference reduction circuit includes four directional couplers 3, 4, 5, and 6 with voltage coupling coefficients $k_i$ and four variable phase shifters 7, 8, 9, and 10, having phase shifts given by $\phi_{ij}$. Each of the directional couplers has two input ports and two output ports with one of the input ports of each of couplers 3 and 5 being terminated in a load impedance and one of the output ports of each of couplers 4 and 6 being terminated with a load impedance. One output port of directional coupler 3 is directly coupled to an input port of coupler 4 through phase shifter 7, while the other output port is cross-coupled to an input port of coupler 6 through phase shifter 8. In similar manner, one output port of coupler 5 is directly coupled to an input port of coupler 6 through phase shifter 9, while the other output port is cross-coupled to an input port of coupler 4.

Now, let the port voltages be applied to the input ports 1 and 2 of the circuit shown in FIG. 4. It is a simple matter to show that the output voltages at ports 11 and 12 are $$E_{1A} = \sqrt{(1-k_1^2)(1-k_2^2)}\, E_x\, e^{-j\phi_{12}} - k_2 k_3 E_y\, e^{-j\phi_{23}} \quad (17)$$

$$E_{1A} = \sqrt{(1-k_3^2)(1-k_4^2)}\, E_y\, e^{-j\phi_{34}} - k_1 k_4 E_x\, e^{-j\phi_{14}} \quad (18)$$

Now, the explicit forms for the output signals are found by using, in Equations (17) and (18), the definitions for $E_x$ and $E_y$ as given by Equation (8).

$$\begin{aligned}
E_{1A} = E_a [&\sqrt{(1-k_1^2)(1-k_2^2)}\, A_{11} e^{j\beta_{11}} {}^{-\phi_{12}}\\
& - k_2 k_3 A_{21} e^{j\beta_{21}} {}^{-\phi_{23}}]\\
+ E_b [&\sqrt{(1-k_1^2)(1-k_2^2)}\, A_{12} e^{j\beta_{12}} {}^{-\phi_{12}}\\
& - k_2 k_3 A_{22} e^{j\beta_{22}} {}^{-\phi_{23}}]
\end{aligned} \quad (19)$$

$$\begin{aligned}
E_{2A} = E_a [&\sqrt{(1-k_3^2)(1-k_4^2)}\, A_{21} e^{j\beta_{21}} {}^{-\phi_{34}}\\
& - k_1 k_4 a_{11} e^{j\beta_{11}} {}^{-\phi_{14}}]\\
+ E_b [&\sqrt{(1-k_3^2)(1-k_4^2)}\, A_{22} e^{j\beta_{22}} {}^{-\phi_{34}}\\
& - k_1 k_4 A_{12} e^{j\beta_{12}} {}^{-\phi_{14}}]
\end{aligned} \quad (20)$$

In order for the interfering signals to be eliminated in each channel it is necessary that the coefficient $E_b$ vanish at port 11 and the coefficient of $E_a$ must vanish at port 12. Therefore, the two equations which must be satisfied are $$\sqrt{\frac{(1-k_1^2)(1-k_2^2)}{e^{j\beta_{22}}{}^{-\phi_{23}}}}\, A_{12} e^{j\beta_{12}}{}^{-\phi_{12}} - k_2 k_3 A_{22} = 0 \quad (21)$$

$$\sqrt{\frac{(1-k_3^2)(1-k_4^2)}{e^{j\beta_{11}}{}^{-\phi_{14}}}}\, A_{21} e^{j\beta_{21}}{}^{-\phi_{34}} - k_1 k_4 A_{11} = 0 \quad (22)$$

By multiplying Equation (21) by $e^{-j(\beta_{12}{}^{-\phi_{12}})}$ and Equation (22) by $e^{-j(\beta_{21}{}^{-\phi_{34}})}$ and demanding that the terms in both equations be real, the following conditions are imposed on the values of $\phi_{14}$ and $\phi_{23}$:

$$\phi_{23} = \beta_{12} + \phi_{12} \pm 2m\pi;\ m = 0,1,2,... \quad (23)$$

$$\phi_{14} = \beta_{11} - \beta_{21} + \phi_{34} \pm 2m\pi;\ m = 0,1,2,... \quad (24)$$

The phase shifts indicated by Equations (23) and (24) may, of course, be obtained by varying the transmission line lengths or by employing variable phase shifters. In practice, the necessary phase control can be achieved with phase shifters $\phi_{23}$ and $\phi_{14}$. The phase shifters $\phi_{12}$ and $\phi_{34}$ are included in the circuit description for generality.

If it is assumed that the appropriate values of phase shift are incorporated, then Equations (21) and (22) have the form $$\sqrt{(1-k_1^2)(1-k_2^2)}\, A_{12} = k_2 k_3 A_{22} \quad (25)$$

$$\sqrt{(1-k_3^2)(1-k_4^2)}\, A_{21} = k_1 K_4 A_{11} \quad (26)$$

While there are four individual couplers, a simplification is realized by letting $k_2 = k_3$ and $k_1 = k_4$. Then, upon dividing Equation (25) by Equation (26) the relationship between the $k$'s is found to be $$k_2^2/k_1^2 = \frac{A_{11} A_{12}}{A_{21} A_{22}} = Q^2 \quad (27)$$

$$k_2 = Q k_1 \quad (28)$$

Substitution of Equation (28) into Equation (26) yields a quartic equation for $k_1$:

$$\sqrt{(1-Q^2 k_1^2)(1-k_1^2)}\, A_{21} = k_1^2 A_{11} \quad (29)$$

or $$k_1^4 [Q^2 - A_{11}^2/A_{21}^2] - k_1^2 [1 + Q^2] + 1 = 0 \quad (30)$$

The solution is of the form $$k_1 = \sqrt{H/G + \sqrt{(H/G)^2 - 4/G}} \quad (31)$$

where $$H = 1 + Q^2 \quad (32)$$

$$G = Q^2 - A_{11}^2/A_{12}^2 \quad (33)$$

The specific solution values for the $k$'s are not of great interest in themselves. The important point to be noted is that for incident signal coditions of practical interest there is a solution for the $k$'s, which means that by employing variable couplers and phase shifters in the circuit of FIG. 4, the $P_w/P_u$ may be considerably improved.

It now remains to consider several special but very important cases which can lend quantitative insight into the performance characteristics of the correcting circuit.

Case 1. $r_a = r_b$

If the axial ratios of the two waves are equal, the corresponding equations are considerably simplified. An examination of the appropriate equations reveals that in Equation (27), $Q = 1$. Then $k_1 = k_2 = k$ and all four couplers have the same value of coupling. Furthermore, from Equations (23) and (24), $\phi_{23} = \phi_{14}$. Then from Equation (29)

$$K = \sqrt{\frac{A_{21}}{A_{11} + A_{21}}}$$

$$= \frac{1}{\sqrt{1 + \sqrt{\frac{\cos^2\alpha + r^{-2}\sin^2\alpha}{\sin^2\alpha + r^{-2}\cos^2\alpha}}}} \quad (34)$$

When this value of $k$, along with the appropriate phase shifters indicated by Equations (23) and (24) are inserted into Equation (19), the output voltage at port 11 is given by $$E_{1A} = E_a[(1-k^2) A_{11} - k^2 A_{21}]$$

$$= E_a \left[\frac{A_{11}^2 - A_{21}^2}{A_{11} + A_{21}}\right] = E_a[A_{11} - A_{21}] \quad (35)$$

The coefficient of $E_a$ represents the insertion (voltage) gain to the $E_a$ signal (it is always less than unity). The insertion loss in $dB$ is, therefore, given by $$L = -20 \log [|A_{11} - A_{21}|] \, dB \qquad (36)$$

Case 2. $r_a = \infty = r_b$

When both waves are linearly polarized, the equations are further simplified. The coupler values are all identical as are the interconnecting line lengths. The value of coupling, from Equation (34), reduces to $$k = \sqrt{\frac{\sin \alpha}{\cos \alpha + \sin \alpha}} \qquad (37)$$

and the output voltage at port 11 becomes (from Equation (35))

$$E_{1A} = E_a [\cos \alpha - \sin \alpha] \qquad (38)$$

The term $[\cos \alpha - \sin \alpha]$ represents the insertion gain.

Case 3. $\gamma > 90°$

Figure 5:
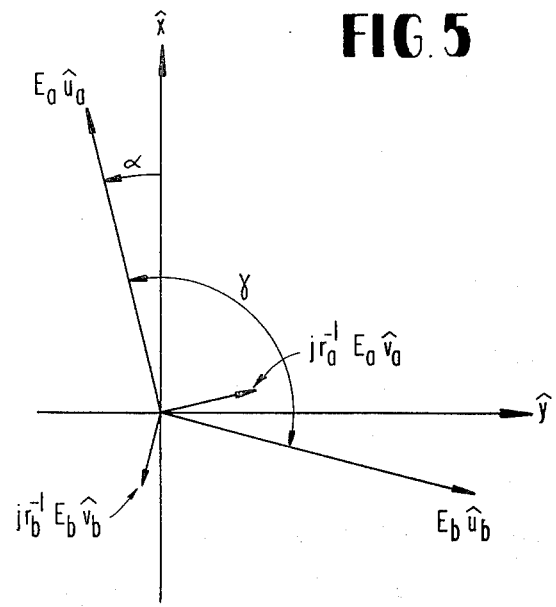
FIG. 5 illustrates another general set of two frequency reuse signals wherein the spatial angle between the major axes is greater than 90°.

The preceding results have been derived from two non-orthogonal signals for which the spatial angle, $\gamma$, between the major axes is less than 90°. The correcting circuit works equaly well if $\gamma > 90°$ provided that an additional 180° of phase shift is included in one of the cross-coupling lines. This can be demonstrated with reference to FIG. 5 which shows two signals with $\gamma > 90°$. As before, the ports are adjusted such that the $P_w/P_u$ is equalized in both channels. The port voltages are then $$E_x = E_a [\cos \alpha + j r_a^{-1} \sin \alpha] - E_b [\sin \alpha + j r_b^{-1} \cos \alpha] \qquad (39)$$

$$E_y = -E_a [\sin \alpha - j r_a^{-1} \cos \alpha] + E_b [\cos \alpha - j r_b^{-1} \sin \alpha] \qquad (40)$$

The coefficients of $E_a$ and $E_b$ are the same as indicated by the $c_{ij}$ of Equations (4) – (7) except that $\sin \alpha$ is replaced by $-\sin \alpha$. The matrix expression of Equations (39) and (40) using the polar form of the coefficients is $$\begin{bmatrix} E_x \\ E_y \end{bmatrix} = \begin{bmatrix} A_{11} e^{j\delta_{11}} & A_{12} e^{j(\delta_{12} + \pi)} \\ A_{21} e^{j(\delta_{21} + \pi)} & A_{22} e^{j\delta_{22}} \end{bmatrix} \begin{bmatrix} E_a \\ E_b \end{bmatrix} \qquad (41)$$

where $$\delta_{ij} = -\beta_{ij} \text{ (cf. Equations (13) – (16))}$$

The substitution of Equations (41) into the expressions for the output voltage for the interference reduction circuit (Equations (17) and (18)) will lead to a set of phase relations identical to Equations (23) and (24) with $\beta_{ij}$ replaced by the corresponding exponential terms of Equation (41). Since the "1,2" term of the above matrix contains the extra $\pi$ term, the phase length for the $\phi_{23}$ line becomes $$\phi_{23} = \delta_{22} - (\delta_{12} + \pi) + \phi_{12} - 2m\pi \qquad (42)$$

Similarly, $$\phi_{14} + \delta_{11} - (\delta_{21} + \pi) + \phi_{32} - 2m\pi \qquad (43)$$

Therefore, the lines contain an additional phase difference of 180° compared to the case when $\gamma < 90°$.

Also, the coupler values remain unchanged from their values for $\gamma < 90°$. The major point here is that the circuit can accommodate the most general types of non-orthogonal signals by using variable couplers and variable phase shifters.

Figure 6:
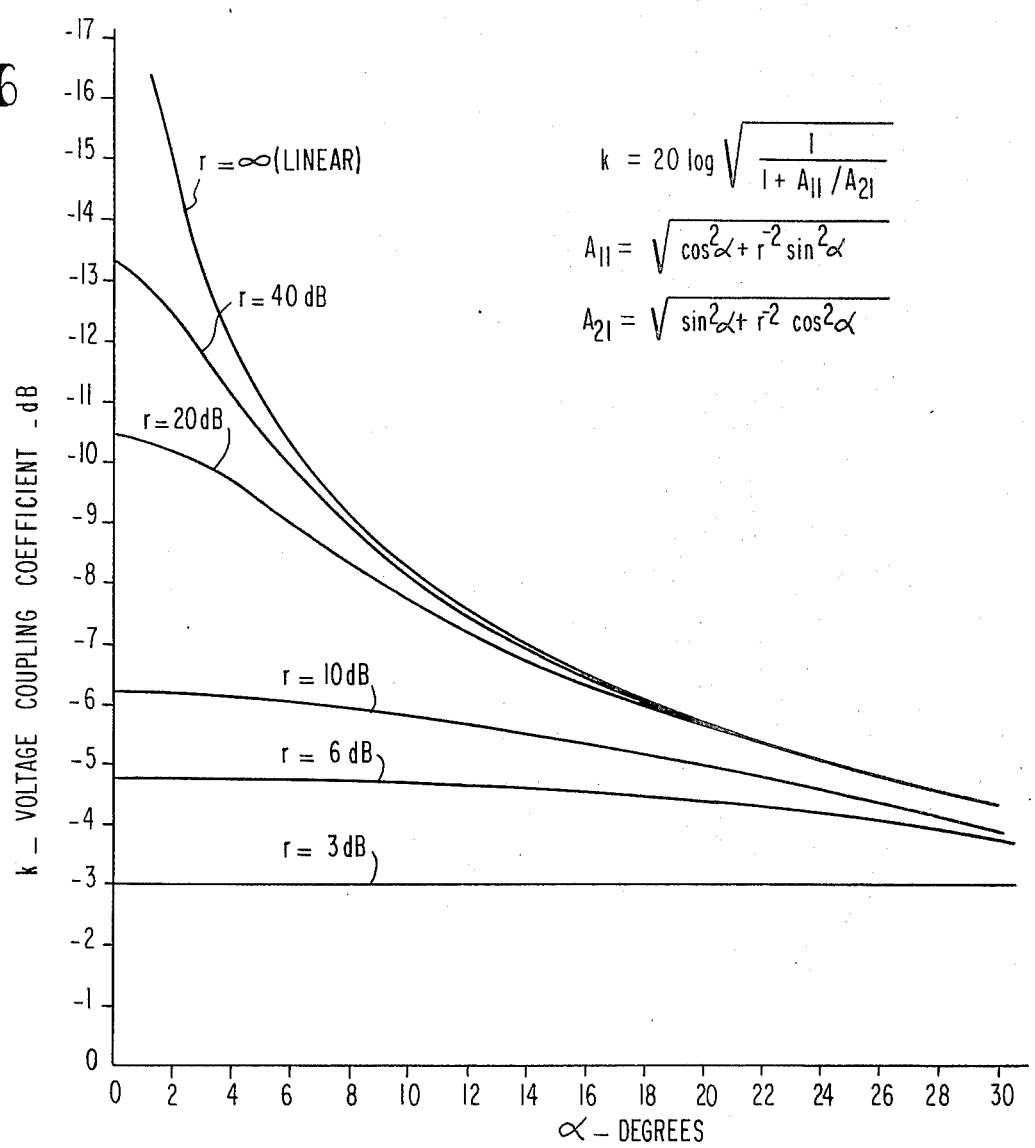
FIG. 6 is a graph of a series of curves showing the values of the coupling coefficients as a function of misalignment angle required to achieve an infinite signal-to-interference ratio for the case where the waves have equal axial ratio and equal amplitudes.
Figure 7:
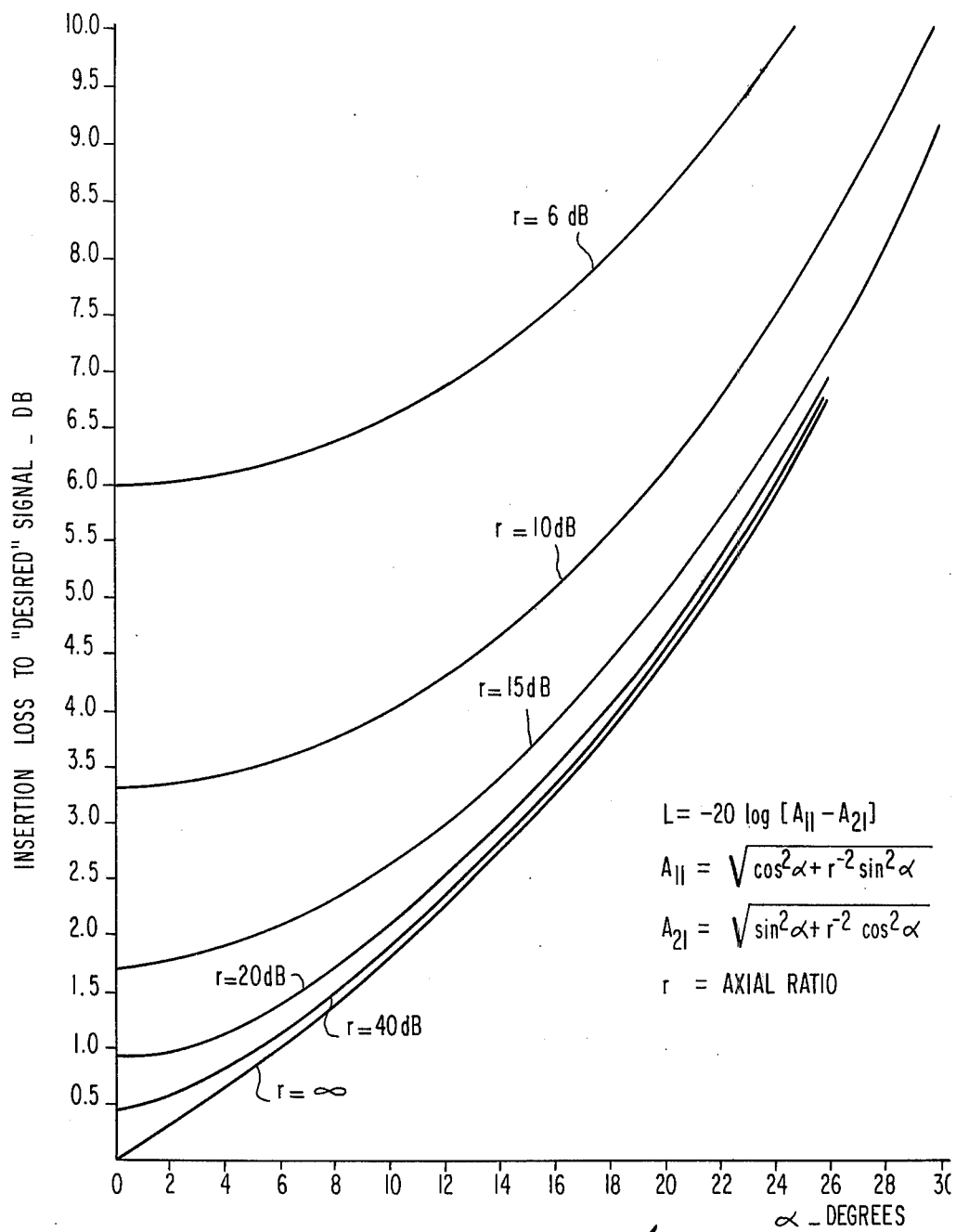
FIG. 7 is a graph of a series of curves showing the insertion loss as a function of misalignment angle for signals having identical axial ratios and equal amplitudes incident on the interference reduction circuits.

It is instructive to compute the coupler values and the insertion loss for various conditions. While the most general case consists of signals which have different axial ratios, considerable qualitative and quantitative insight into the behaviour of the circuit can be obtained by considering the much simpler, but very important, case of two non-orthogonal signals which have the same axial ratio. For this case, it will be recalled that the coupler values are given by Equation (34) and the insertion gain to the "desired" signal is given by Equation (36). These equations are plotted in FIGS. 6 and 7 as a function of $\alpha$ for various values of axial ratio, $r$.

For the case corresponding to $\alpha = 0$ the two waves are spatially orthogonal but have finite axial ratio and the interference reduction circuit yields infinite $P_w/P_u$ in each channel with the following coupler values and insertion loss:

$$k(\alpha = 0) = \frac{1}{\sqrt{1 + r}} \qquad (44)$$

$$L(\alpha = 0) = -20 \log \left(1 - \frac{1}{r}\right) dB \qquad (45)$$

Equations (44) and (45) represent the minimum coupler value and insertion loss when the axial ratios of the two waves are finite, of equal amplitude, and have the same sense of rotation. For a given value of $\alpha$, the lowest insertion loss and smallest value of k are obtained when the signals are linearly polarized. Also, the loss approaches infinity as either $\alpha \rightarrow 45°$ or $r \rightarrow 1$ since, for these conditions the signals are "parallel" in polarization space.

Figure 8:
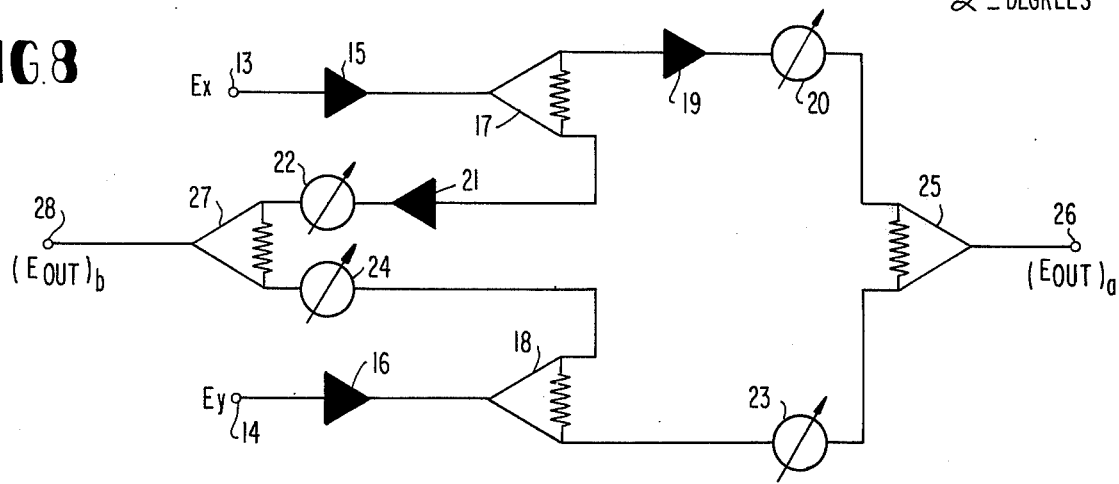
FIG. 8 is a block and schematic diagram of an alternate embodiment of the interference reduction circuit using active devices.

In the discussion thus far, it has tacitly been assumed that passive couplers and phase shifters are used throughout. This assumption is not necessary and, in fact, a practical implementation of the correcting circuit employs active amplifiers and phase shifters as shown, for example, in FIG. 8. The basic philosophy of interference reduction remains the same, i.e., to cross-couple a number of signals to effect cancellation of interference. As shown in FIG. 8, the input signals $E_x$ and $E_y$ from the receiving antenna system are coupled to input ports 13 and 14, respectively. After amplification by amplifiers 15 and 16, the input signals are coupled to power dividers 17 and 18, respectively. Power dividers 17 and 18 are reciprocal devices and divide the output power from each of amplifiers 15 and 16 into two branch circuits. In one of these, one output of power divider 17 is connected to the input of an amplifier 19 connected in series with a variable phase shifter 20. The other output of divider 17 is connected to the input of an amplifier 21 connected in series with a variable phase shifter 22. In the case of power divider 18, one output is connected to a variable phase shifter 23, while the other output is connected to a variable phase shifter 24. The outputs of phase shifters 20 and 23 are combined by power divider 25 connected to provide one output signal $E_a$ at output port 26 and the outputs of phase shifters 22 and 24 are combined by divider 27 to provide the other output signal $E_b$ at output port 28.

The extension to more than two signals is straightforward in principle and can be considered in terms of two situations, namely, when the signals are incident from different spatial directions and when they are incident from the same spatial direction and can be distinguished only by their polarizations. Picture, for example, three linearly polarized signals whose polarizations vectors are separated by 120°. In both cases, it is assumed that there is at least one port for each desired signal and, at that port, the amplitude of the desired signal is at least greater than the amplitudes of all the other signals at that port. If an N-port "signal matrix" is envisioned, the above statement is equivalent to demanding that the absolute value of the diagonal term of any row is larger than any of the off-diagonal terms.

The process of interference reduction is equivalent to "diagonalizing" the signal matrix. In the event the signals are incident from different spatial directions, the rank of the matrix is the same as the number of directions from which the signals are coming. If all the directions are different, each row of the matrix is independent and the circuit which diagonalizes it has the effect of placing pattern pulls in the spatial directions in all the interfering signals.

However, in the event the signals are arriving from the same spatial direction, the signal matrix is fundamentally limited to being of order two. If the number of signals is greater than two, then not all the equations are independent and the maxtrix possesses at least one eigenvalue which is zero. This means that it is not possible to employ a single cascade network which will couple out all the desired signals such that they each have infinite $P_w/P_u$.

However, this does not preclude the possibility of initially power dividing each signal N ways. Then, a number of networks operating in "parallel" can be used to extract various combinations of signals. Subsequent networks can then be used for recombination of signals such that each signal has an improved $P_w/P_u$.

Another approach of practical importance is that of "almost" diagonalizing a given signal matrix. In this case, a routine can be envisioned in which a search is made for circuit element values which optimize the $P_w/P_u$ for each signal subject to the constraint that the signal-to-noise ratio (S/N) remains above a specified minimum value.

The preceding analysis has shown that, by using a network made up of variable couplers and phase shifters, interference cancellation can result for incident signals which are arbitrarily polarized. It may be noted that, in the event the signals are linearly polarized, all phase shifts are identical (except for a possible 180° difference in the cross-coupled lines) and, furthermore, all coupler values are identical assuming equal-amplitude signals. This suggests that a rather simple circuit can result if the incident elliptically polarized signals are first converted to linear polarization. This linearization is a simple matter of inserting a specified amount of phase shift to a particular portion of each of the incident waves. The mathematical relations which must be satisfied are derived here in terms of the polarization quantities which have already been defined.

For a wave such as $E_a$ or $E_b$ shown in FIG. 3, the ratio of left to right hand circular components is $$E_L/E_R = q = \frac{r-1}{r+1} e^{j2\tau} \qquad (46)$$

where $r$ is the axial ratio and $\tau$ is the tilt angle of the major axis. With the x-axis as reference, $\tau = \alpha$ for $E_a$ and $\tau = 90° - \alpha$ for $E_b$. As before, the sign of $r$ determines the sense of rotation (−) for left hand, (+) for right hand. Now, the ratio of y-component to x-component is $$p = E_y/E_x = j \left[\frac{q-1}{q+1}\right]$$
$$= j \left\{\frac{\left(\frac{r-1}{r+1}\right) e^{j2\tau} - 1}{\left(\frac{r-1}{r+1}\right) e^{j2\tau} + 1}\right\} \qquad (47)$$

The magnitude of $p$ is $$|p| = \sqrt{\frac{(r^2+1) - (r^2-1)\cos 2\tau}{(r^2+1) + (r^2-1)\cos 2\tau}} \qquad (48)$$

The phase angle of p is obtained by rationalizing Equation (47)

$$p = j \left\{\frac{(r-1)^2 + (r+1)^2 + j 2(r^2-1)\sin 2\tau}{(r-1)^2 + (r+1)^2 + 2(r^2-1)\cos 2\tau}\right\}$$

Then, $$\arg(p) = \tan^{-1}\left[\frac{2r}{(r^2-1)\sin 2\tau}\right] \qquad (49)$$

In order to linearize the fields, $\arg(p_a)$ and $\arg(p_b)$ must be set to zero. For wave $E_a$: $r = r_a$, $\tau_a = \alpha$. For wave $E_b$: $r = r_b$, $\tau_b = \alpha + \gamma$.

The condition $\arg(p_a) = \arg(p_b)$ then leads to $$\tan^{-1}\left[\frac{2r_a}{(r_a^2-1)\sin 2\alpha}\right] = \tan^{-1}\left[\frac{2r_b}{(r_b^2-1)\sin 2(\alpha+\gamma)}\right] \qquad (50)$$

The solution for $\alpha$ is $$\alpha = \frac{1}{2}\tan^{-1}\left[\frac{\sin 2\gamma}{\frac{r_b(r_a^2-1)}{r_a(r_b^2-1)} - \cos 2\gamma}\right] \qquad (51)$$

By fixing the x-y coordinates such that the above condition is satisfied, then applying a phase delay of $\arg(p_a)$ to the y-axis component of signals, the result is two non-orthogonal linearly polarized signals. These may then be applied to the interference reduction circuit.

It is interesting to note that if $r_a = r_b$, then the value of $\alpha$ is just that which equalizes the $P_w/P_u$ in each channel, i.e., the ports are arranged as in FIG. 3. Then, the complete interference reduction circuit merely has a phase shifter inserted into the y-port signal path.

Figure 9:
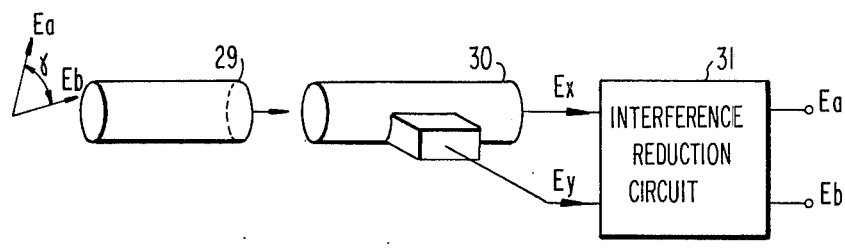
FIG. 9 illustrates an alternate embodiment of the circuit for elliptically polarized signals.

In general, this alternate interference reduction circuit appears as in FIG. 9. The polarizer 29, which is a variable phase shifter for one polarization, receives the non-orthogonal elliptically polarized waves $E_a$ and $E_b$. The output of polarizer 29 is connected to a rotatable orthomode transducer 30. Polarizer 29 and transducer 30 are independently rotatable so that the outputs $E_x$ and $E_y$ fed to the inputs of the interference reduction circuit 31 are two non-orthogonal linearly polarized signals. The outputs of circuit 31 are then the isolated signals $E_a$ and $E_b$.

Other realizations are possible. As an example of the extremely simple nature of the interference reduction circuit for linearly polarized signals, FIGS. 10A and 10B show a stripline realization using printed circuit directional couplers.

Figure 10A:
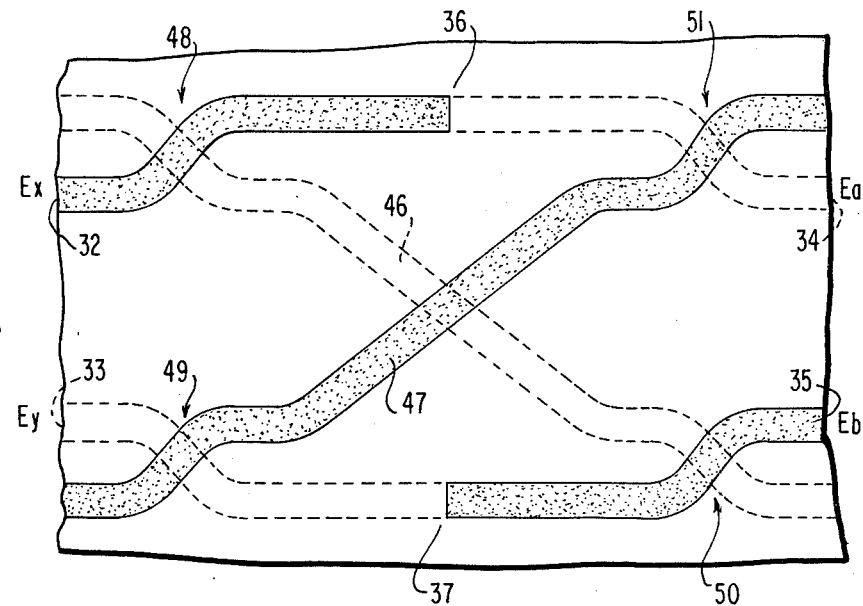
FIGS. 10A and 10B show in plan and cross-section views, respectively, a stripline realization of the interference reduction circuit.
Figure 10B:
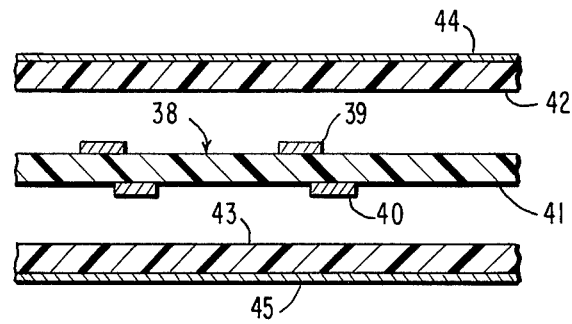

FIG. 10A represents a plan view of the center "sandwich" of the stripline circuit with the solid lines indicating lines printed on the upper surface of the sandwich and the dotted lines indicating lines printed on the lower surface. It is to be noted that the two lines running between the input ports 32, 33 and the output ports 34, 35, respectively, pass through the sandwich at points 36 and 37. Thus, the line beginning with input port 32 is printed on the top surface of the sandwich to the point 36 and thereafter is printed on the bottom surface. The opposite is true of the line beginning with input port 33. The relationship of the center sandwich 38 with conductors 39 and 40, for example, printed on upper and lower surfaces of a dielectric board 41 with respect to upper and lower dielectric boards 42 and 43 carrying ground planes 44 and 45, respectively, is illustrated in FIG. 10B.

In FIG. 10A, the input signals $E_x$ and $E_y$ are coupled to the input ports 32 and 33. Most of the power is transmitted directly from the input ports 32 and 33 to the output ports 34 and 35, respectively; however, a portion of the power at input ports 32 and 33 is coupled to cross-coupling lines 46 and 47 at cross-over points 48 and 49, respectively. This power is then, after a suitable phase delay as determined by the lengths of lines 46 and 47, coupled to the direct input-output lines at cross-over points 50 and 51, respectively, to cancel the interfering signals in the two channels. As a result, the isolated signals $E_a$ and $E_b$ appear at the output ports 34 and 35.

Figure 11:
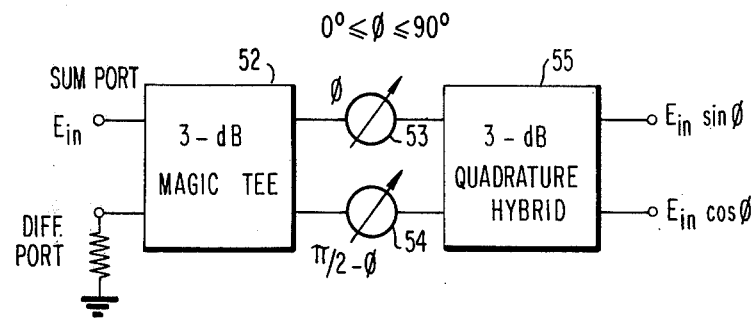
FIG. 11 illustrates in block diagram one possible implementation of a variable power divider using fixed couplers and variable phase shifters.

In another embodiment, the interference reduction circuit uses fixed couplers and variable phase shifters to achieve the effect of a variable coupler. A variable coupler employing this concept is illustrated in FIG. 11. This coupler uses a fixed 3dB power divider, such as a magic Tee, 52, variable phase shifters 53 and 54, and a fixed 3dB quadrature hybrid 55. Any desired ratio of power division may be obtained by suitable choice of phase shift, $\phi$, between 0° and 90°. With this concept, an interference reduction circuit as shown in FIG. 4 can be made using only fixed couplers and variable phase shifters. Such a circuit is desirable from the viewpoint that variable phase shifters may be electrically driven and are, therefore, suitable for dynamic control.

Up to this point, implementation of the invention assumes a priori knowledge of the axial ratios and tilt angles of the incoming waves. A practical implementation, however, should be adaptive and achieve interference reduction with no a priori knowledge of the incoming signals. This may be accomplished by using pilot or beacon signals which are associated with each communications signal. Circuitry which is sensitive to the presence of the beacon signals is used to drive amplifiers or attenuators and phase shifters to reduce the amplitude of the beacons and, hence, the associated interfering communications signals to zero in the appropriate channels.

It is clear that the circuit is not restricted to be placed between the antenna and the first receiver stage. The circuit can be located following the RF amplifiers, following any channelization into a number of frequency bands, or even following conversion to another frequency providing that the coherency between the desired signal in one channel and the interference in another channel is sufficiently preserved. The design considerations implied by the necessity of maintaining coherence are well known.

According to one illustrative embodiment of the invention, an adaptive interference cancellation circuit is able to dynamically compensate for cross-polarization interference. Since the interference on either channel of a dual-polarized satellite frequency reuse system consists of a component of the signal on the opposite polarization channel, the interfering signal available at the receiving end is relatively coherent with the desired signal in the other polarization channel and, hence, cancellation can be effected by adding in a sample of the signal from the oppositely polarized channel of equal amplitude, but of opposite phase to the interference.

The cancellation system design is a symmetrical one. What is done to cancel interference on the left channel by adding in a signal from the right channel is repeated exactly to cancel interference on the right. Therefore, only one case is described.

Figure 12:
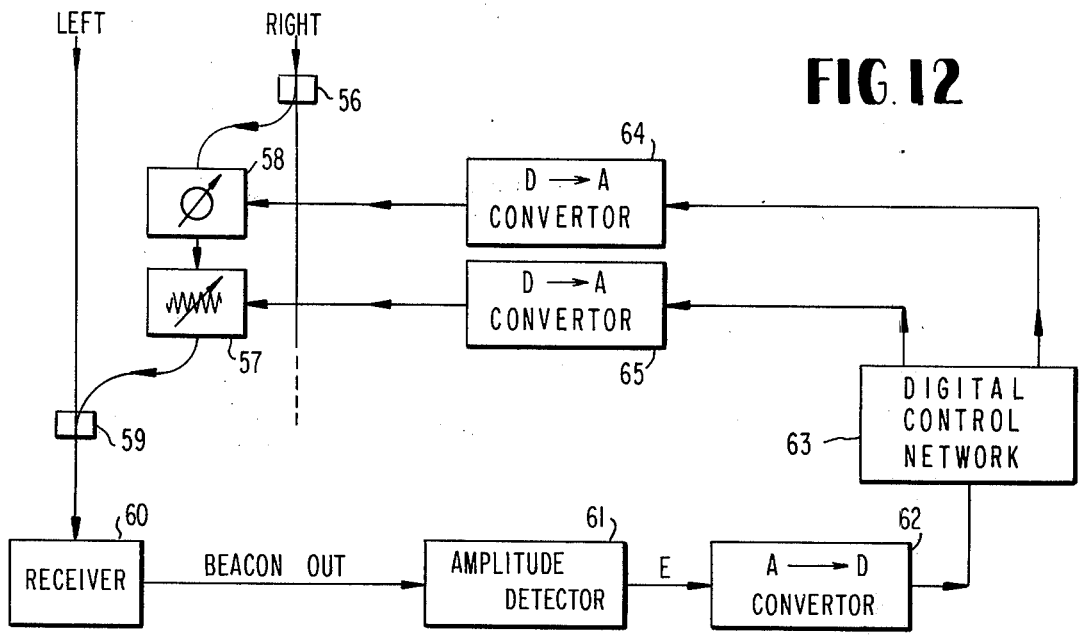
FIG. 12 is a system diagram of a closed loop for effecting cancellation of cross-polarization interference in one channel.

FIG. 12 shows the basic system structure for cancellation of cross-polarization interference on the left channel. A beacon signal is transmitted on the right channel somewhere in the band being corrected. The amount of interference is measured simply by detecting the magnitude of the beacon which is present on the left channel as derived from power divider 56. The coupling of the signal to cancel the interference is done at RF through a voltage controlled attenuator 57 and a voltage controlled phase shifter 58. The detection and control circuitry follows the coupler 59, and coherence is not required between both polarizations through any subsequent stages. The interference is minimized by detecting the magnitude of the beacon and driving the voltage controlled phase shifter 58 and attenuator 57 until the magnitude of the beacon signal is minimized.

Because the amplitude of the beacon signal is the important parameter, the first system block after the receiver 60 is an amplitude detector circuit 61 the output of which is a nominally DC error signal (E) proportional to the magnitude of the beacon.

A systematic minimization technique is employed which minimizes first by phase control and then by amplitude control, or vice-versa and keeps switching and minimizing to obtain and hold a true null. This type of circuit lends itself to digital techniques so the next block in the system design is an annalog-to-digital convertor 62 which converts the analog error voltage, E, to a digitally useful form.

The next system block is a digital control network 63 that decides which control to adjust (phase or amplitude), and in which direction to adjust it to reach a minimum. This network produces two outputs each consisting of an N bit word. One of these words represents the voltage to be fed to the attenuator and the other represents the phase shifter control voltage. Following the control network are two digital-to-analog convertors 64 and 65 which change the digital control words to analog voltages suitable for driving the voltage controlled phase shifter and attenuator, respectively.

Figure 13:
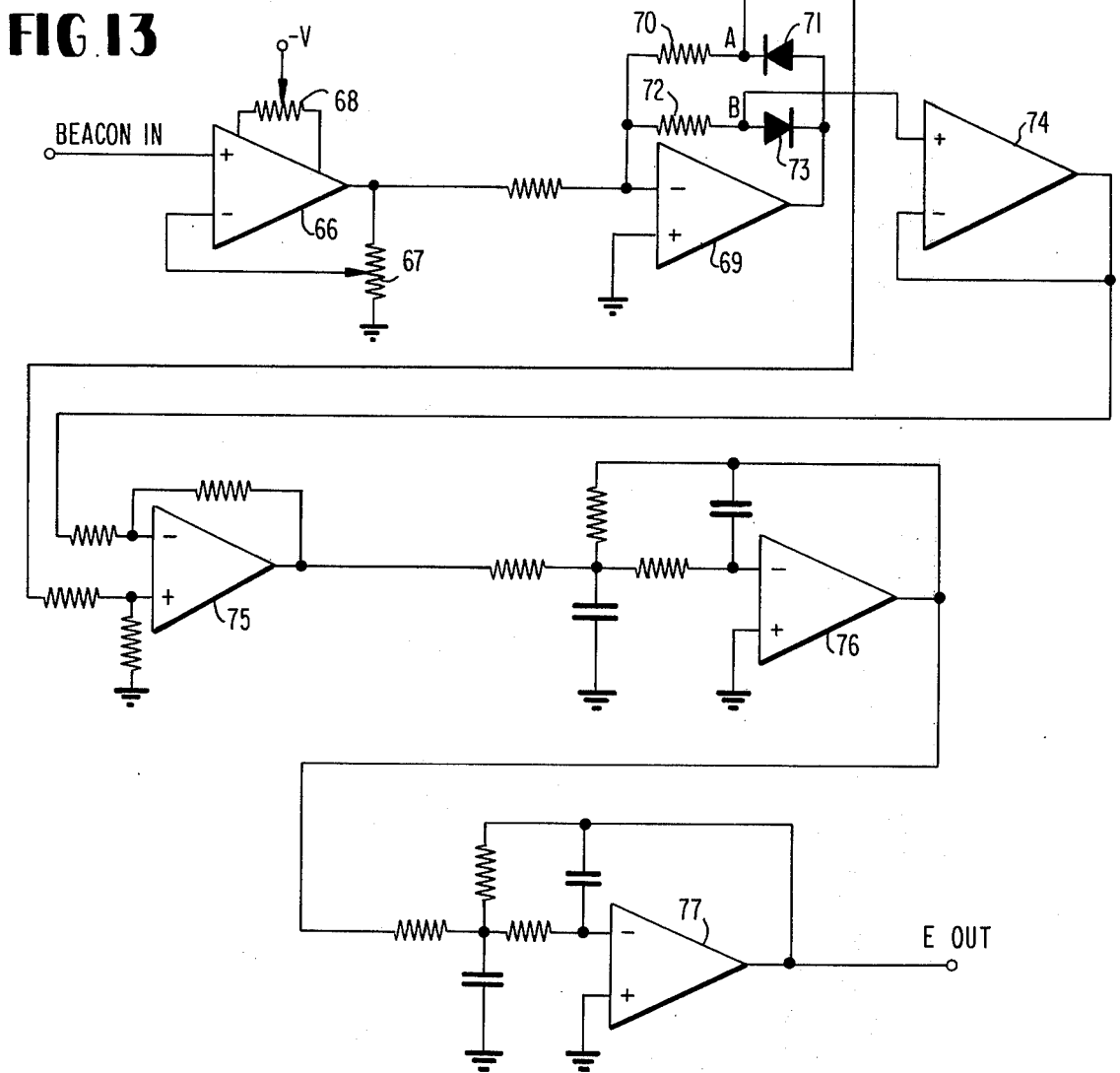
FIG. 13 is a schematic diagram of a possible implementation of a beacon amplitude detector used in the system of FIG. 12.

The beacon amplitude detector is shown in FIG. 13. The input to this stage is the beacon after it has been detected and brought down to audio frequency. Operational amplifier 66 is used to provide amplification of the beacon. It also serves as a high impedance load for the receiver and provides isolation from the rest of the circuitry. The potentiometer 67 allows the gain of this stage to be varied from unity to the amplifier's open loop gain. The potentiometer 68 is used to control internal DC offset null since any offset from this stage would prevent the circuit from reaching an accurate null.

Operational amplifier 69 serves as two opposite sense half wave rectifiers having series connected resistor 70 and diode 71 and series connected resistor 72 and oppositely poled diode 73 each connected across its input and output. The amplifier 69 compensates for the 0.6 volt drop across the diodes 71 and 73. The positive half of the beacon appears at point "A" while the negative half appears at point "B".

Operational amplifier 74 is a unity gain buffer stage to keep the differential amplifier circuit 75 which follows from interacting with the rectifier. If this buffer were not present, the rectifier would not be able to maintain a zero voltage at point B during the positive output cycle due to current being forced by the differential amplifier to go through the resistor 72 to the inverting terminal of the rectifier circuit amplifier 69.

Operational amplifier 75 is used as a differential amplifier of unity gain to produce a full wave rectified version of the beacon at its output. Operational amplifiers 76 and 77 are both used in two pole active low pass filters. By cascading these two filters, a total filter of four poles is generated. For higher frequency beacon signals, a four pole Butterworth filter may be employed. The output from amplifier 77 is the error signal, E, which is to be driven to a minimum.

Figure 14:
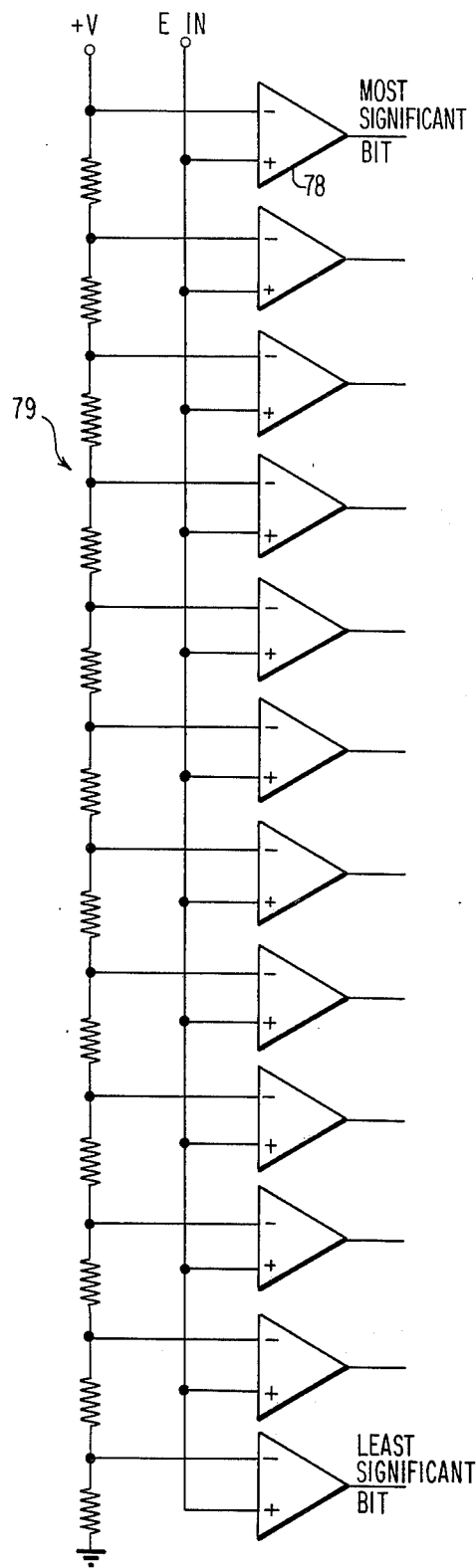
FIG. 14 is a schematic diagram of the analog-to-digital convertor used in the system of FIG. 12.

The analog-to-digital converter is shown in FIG. 14. This circuit converts the error signal, E, to a digitally useful form by means of differential voltage comparators 78. If the voltage at the negative input terminal of the comparator is greater than the voltage at the positive terminal, the output will be the voltage level signifying logical zero. If the voltage at the positive terminal is greater than the voltage at the negative terminal, then the output of the comparator signifies logical one.

The reference voltage is divided down by the resistor voltage divider 79 to provide 12 references with which the error signal is simultaneously compared. This produces a 12 bit word.

As the error signal is made smaller, more and more bits become logical 0, beginning with the most significant bit and ending with the least significant bit. Thus, the objective of the control system, from the digital point of view, will be to maintain all the bits of the 12 bit error word at logical 0.

The digital control network can be divided into two major sections. First, there is a digital differentiator which analyzes the direction of change with time of the error signal, E. Then there is a state machine which has four mutually exclusive states:

1. Amplitude increase,
2. Amplitude decrease,
3. Phase increase, and
4. Phase decrease.

These states refer to which control is being operated and the direction in which the control voltage is being varied.

Figure 15:
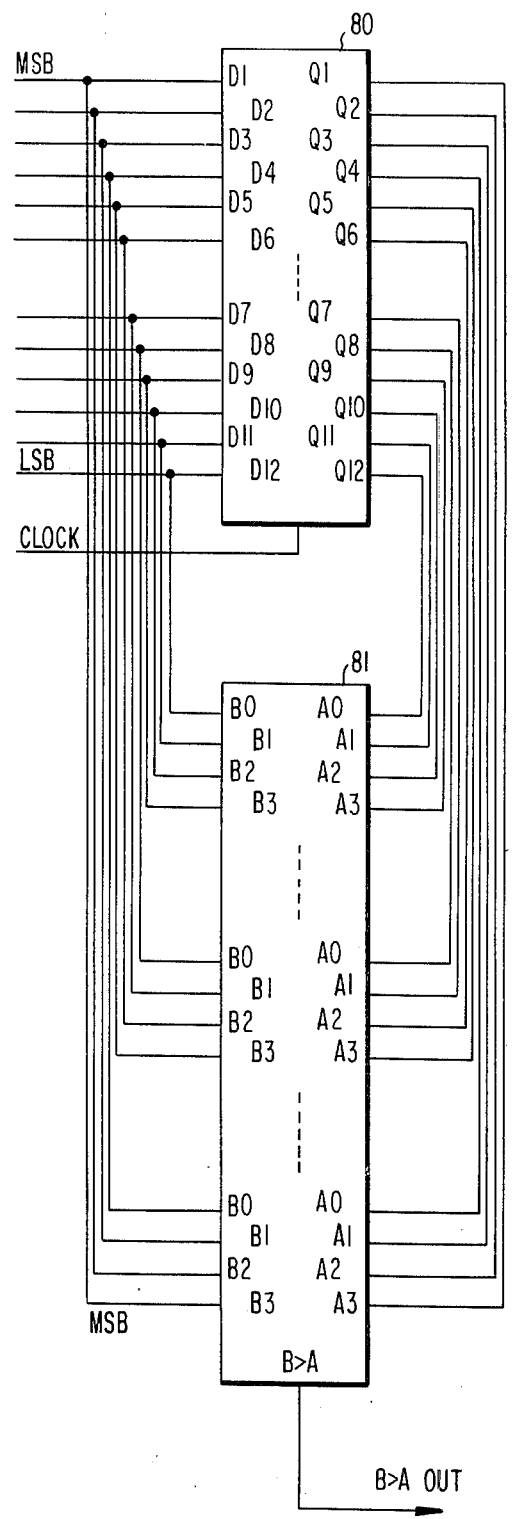
FIG. 15 is a block diagram of the digital differentiator used in the digital control network of the system of FIG. 12.

The digital diferentiator is shown in FIG. 15 and consists of a memory 80 and a comparator circuit 81.

The 12 bit error word is fed into the memory data inputs and the Q outputs constitute the 12 bits as they were when the clock last went high. While the clock is high, the outputs remain in this state. During the periods when the clock is low, $Q_x = D_x$. This does not, however, create any difficulties since the information can be taken at any point during the clock cycle.

The error word and the previous error word are then compared by a 12 bit magnitude comparator 81. Since the objective is to minimize E, the relevant information is whether or not the word in memory is of greater or smaller magnitude than the present error word. If the word in memory is smaller, this indicates that the direction of correction is wrong and should be reversed. Therefore, the only output from the comparator which is needed is the B > A output which goes to logical 1 if the word in memory is less than the present error word.

Figure 16:
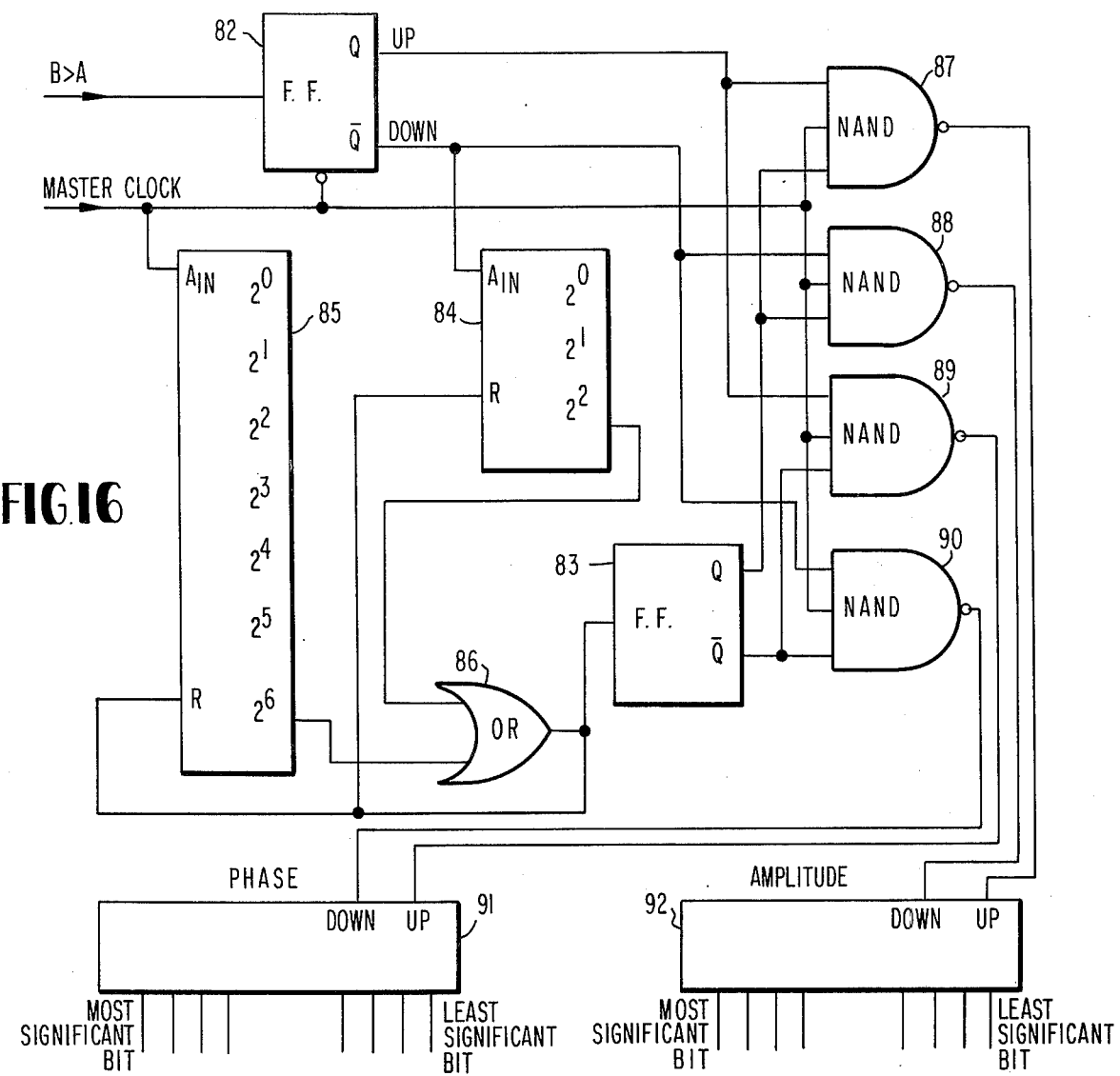
FIG. 16 is a block and logic diagram of the state controller used in the digital control network of the system of FIG. 12.

The state controller shown in FIG. 16 determines which way the controls are being adjusted to effect a minimization. Flip-flop 82 uses the output from the magnitude comparator to determine if the direction of control voltage change is the proper one. The B > A output will be logical 1 if the direction is incorrect and logical 0 otherwise. Thus, this output to the input of the flip-flop 82 will cause the direction of correction to change when the clock goes high if and only if the direction was wrong. The complementary outputs from the flip-flop, Q and Q̄, allow one to be used for count-up control and the other for count-down control.

The second flip-flop 83 is used to control the mode of correcton, phase or amplitude. The outputs will change state whenever the input goes high. This will happen under either of two conditions. The first is when the output of flip-flop 82 changes four times which indicates that a relative minimum has been reached. This is detected simply by the use of a four bit counter 84 whose output will become 1 after four counts.

The other condition is when the master clock has pulsed 64 times as detected by counter 85. This acts simply to set a limit on the amount of time spent in each mode of correction so that neither is neglected too long.

The OR gate 86 will give a 1 when either of the above two conditions has been met. The 1 from the OR gate triggers the mode change by changing the state of flip-flop 83. Simultaneously, when the OR gate 86 goes to 1, the counters 84 and 85 are reset to zero.

The outputs from both flip-flops 82 and 83, along with the master clock input, are then matrixed to four three-input NAND gates 87 to 90. The output of these NAND gates will be logical 0 if all three inputs are logical 1, and will be logical 1 if one or more inputs are 0. Thus, one of these four NAND gates will have an output which follows the master clock and the other three will remain at logical 1. These four NAND gate outputs are fed into the phase and amplitude count-up and count-down counters 91 and 92, respectively, to generate the binary numbers representing the desired phase and amplitude control voltages. Because only one of the four NAND gates will follow the clock at any time, only one counter will be pulsed, and only in one direction, which is the desired control procedure.

Figure 17:
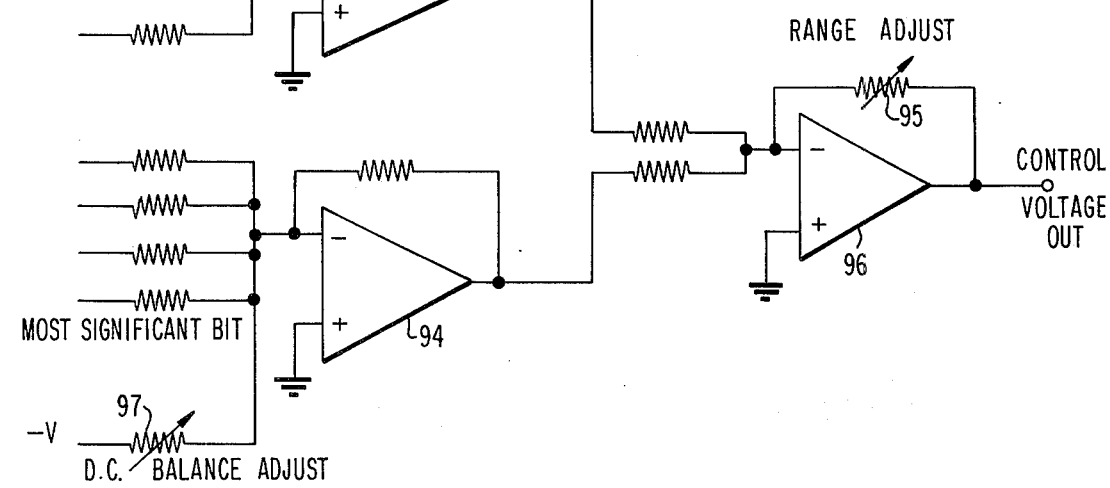
FIG. 17 is a schematic diagram of the digital-to-analog convertor used in the system of FIG. 12.

An example of the digital-to-analog convertors 64 and 65 is shown in FIG. 17. These convertors are designed around the use of operational amplifier summing junctions. The gain of each input goes up by a factor of two for each more significant bit. The conversion is done in two stages. The first two amplifiers 93 and 94 each convert four bits at a time. The outputs from these convertors are then summed to give a step division of the control voltage range. The extent of the control range can be varied by use of the variable resistor 95 as the feedback resistor on operational amplifier 96. The variable resistor 97 allows a DC bias to be added to place this range anywhere within the supply limit. These controls allow the circuit to be easily matched to whichever voltage controlled phase shifters or attenuators are being used.

It will be appreciated by those skilled in the art that a circuit concept has been described whereby the signal-to-interference ratios of non-orthogonal signals may be substantially improved. The general approach which has been used involves the cross-coupling of non-orthogonal signals in such a way that interference is cancelled. The concept is extendible to many signals. It should be obvious that the concept employed can be made to be reciprocal and, in fact, is reciprocal when passive components are used. Thus, the circuit can generate non-orthogonal signals. This might be done at the sending end of a link, for example, to pre-couple two signals in such a way as to compensate for the effects of propagation. It will be apparent, therefore, that the embodiments shown are only exemplary and that various modifications can be made in construction and arrangement within the scope of the invention as defined in the appended claims.

I claim:

1. An interference reduction circuit for use in a receiver of frequency reuse communications systems wherein a plurality of signals of the same frequency at predetermined different polarizations are transmitted from a remote location and the transmission media alters the relative polarizations between said plurality of signals thereby introducing cross-talk between the signals when they are received, said interference reduction circuit comprising:
   a. a first plurality of hybrid coupling networks each receiving one of said transmission media altered signals and dividing each of said signals into a number of circuit paths equal in number to the number of received signals,
   b. phase-shift means in each of said circuit paths for producing phase shifts in each of said signals, and
   c. a second plurality of hybrid coupling networks each connected to one of said circuit paths from each of said first plurality of hybrid coupling networks after said phase-shift means for cross-coupling said circuit paths and thereby adding a sample of all other signals of equal amplitude, but opposite phase, to the cross-talk interference in each signal and thereby substantially cancelling the cross-talk interference in each signal to provide uncorrupted output signals at the outputs of said second plurality of hybrid coupling networks.

2. An interference reduction circuit as recited in claim 1 wherein said hybrid coupling networks are phase variable and said phase shift means are variable phase shifters.

3. An interference reduction circuit as recited in claim 2 wherein each of said variable hybrid coupling networks comprise:
   a. a fixed power divider connected to receive a signal and dividing said signal into two channels,
   b. first and second variable phase shifters connected into a respective one of said two channels, and
   c. a fixed quadrature hybrid circuit connected to said two channels and providing two output circuit paths wherein any desired ratio of power division into said two circuit paths may be obtained by a suitable choice of phase shift.

4. An interference reduction circuit as recited in claim 1 wherein all of the phase shifts produced by each of said phase shift means are identical and each of the cross-coupling input/output division ratios of each of said second plurality of hybrid coupling networks are identical, said interference reduction circuit further comprising means preceding said first plurality of hybrid coupling networks for receiving non-orthogonal, elliptically polarized waves and linearizing the polarization of said waves.

5. An interference reduction circuit as recited in claim 4 wherein said means for linearizing comprises:
   a. a rotatable phase shifter for receiving said non-orthogonal, elliptically polarized waves and providing as an output two waves having a fixed predetermined phase relation between the wave components, and
   b. an orthomode transducer rotatable independently of said rotatable phase shifter for receiving said non-orthogonal, linearly polarized waves and providing as outputs said spatially non-isolated signals.

6. An interference reduction circuit as recited in claim 1 constructed as a microwave stripline circuit comprising a center "sandwich" of microwave stripline circuitry and two ground planes on either side of said center sandwich wherein said first plurality of hybrid coupling networks and said second plurality of hybrid coupling networks each comprises a plurality of striplines electrically isolated from one another but each one of said striplines crossing over at least one other stripline in close proximity thereto so as to couple a portion of the energy propagating along one stripline to another over which it crosses, and wherein said phase shift means comprises predetermined lengths of said striplines.

7. An interference reduction circuit as recited in claim 1 wherein said phase shift means are variable phase shifters and further including variable attenuator means in each of the cross-coupled circuit paths for variably attenuating the signals in said cross-coupled circuit paths.

8. An interference reduction circuit as recited in claim 7 wherein a different pilot signal is transmitted with each of said plurality of signals, said interference reduction circuit further comprising feedback means responsive to the outputs of said second plurality of hybrid coupling networks for detecting a pilot signal indicative of the amount of interference in each of said output signals and adjusting said variable phase shifters and said variable attenuating means in each of said cross-coupled circuit paths to reduce said pilot signal to a minimum.

9. An interference reduction circuit as recited in claim 8 wherein said feedback means comprises for each cross-coupled circuit path:
   a. receiving means connected to the output of the hybrid coupling network receiving the cross-coupled circuit path and tuned to said pilot signal and providing a detected output signal representative of the amount of cross-talk interference in that cross-coupled circuit path, and
   b. control network means receiving said output signal and providing two output control voltages, one of said control voltages being used to control said variable phase shifter and the other control voltage being used to control said variable attenuator means in the cross-coupled circuit path.

10. An interference reduction circuit as recited in claim 9 wherein said control network means is a digital control network and further comprising an analog-to-digital convertor connected to receive said output signal from said receiving means and provide a digital output to said digital control network, and first and second digital-to-analog convertors connected to receive digital outputs from said digital control network and providing said two ouput control voltages.

11. An interference reduction circuit as recited in claim 10 wherein said digital control network comprises:
   a. means for storing a digital word representing the last value of said output signal from said receiving means,
   b. means for digitally comparing the digital word representing the last value of said output signal and a digital word representing the present value of said output signal and providing an output indicative of the result of the comparison,
   c. means for accumulating a first count in either of two directions, said first count digitally representing the value of the control voltage to be applied to said variable phase shifter,
   d. means for accumulating a second count in either of two directions, said second count digitally representing the value of the control voltage to be applied to said variable attenuator means, and
   e. means responsive to the output of said comparing means for controlling the accumulation of said first and second counts in both said accumulating means.

12. An interference reduction circuit as recited in claim 11 wherein said means responsive to the output of said comparing means comprises:
   a. a first flip-flop which changes state whenever the present value of said output signal from said receiving means exceeds the last value of said output signal, the outputs of said first flip-flop controlling the direction of accumulation of said first and second counts in both said accumulating means, and
   b. a second flip-flop which changes state after either a first predetermined number of changes of state of said first flip-flop or a second predetermined number of counts are accumulated in one or the other or the two accumulating means, the outputs of said second flip-flop controlling which of said two accumulating means are accumulating a count at any one time.

13. An interference reduction circuit for use in a receiver of frequency reuse communications systems wherein a plurality of signals of the same frequency at predetermined different polarizations are transmitted from a remote location and the transmission media alters the relative polarizations between said plurality of signals thereby introducing cross-talk between the signals when they are received, said interference reduction circuit comprising:
   a. a first plurality of power dividers each receiving one of said transmission media altered signals and dividing each of said signals into a number of circuit paths equal in number to the number of received signals,
   b. a plurality of variable phase shifters, one in each of said circuit paths for producing variable phase shifts in each of said signals,
   c. a second plurality of power dividers connected in a reciprocal manner to said first plurality of power dividers, each of said second plurality of power dividers being connected to one of said circuit paths from each of said first plurality of power dividers after said variable phase shifters for cross-coupling said circuit paths and thereby adding a sample of all other signals of equal amplitude, but opposite phase, to the cross-talk interference in each signal and thereby substantially cancelling the cross-talk interference in each signal to provide uncorrupted output signals at the outputs of said second plurality of power dividers, and
   d. amplifying means in said circuit paths for amplifying said signals.

* * * * *